(12) United States Patent
Hwang et al.

(10) Patent No.: US 12,334,535 B2
(45) Date of Patent: Jun. 17, 2025

(54) APPARATUS FOR PRE-LITHIATION OF NEGATIVE ELECTRODE AND METHOD FOR PRE-LITHIATION OF NEGATIVE ELECTRODE

(71) Applicant: LG ENERGY SOLUTION, LTD., Seoul (KR)

(72) Inventors: Seung Hae Hwang, Daejeon (KR); Ye Ri Kim, Daejeon (KR); Su Yeon Lee, Daejeon (KR); Oh Byong Chae, Daejeon (KR); Seo Young Jeon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 672 days.

(21) Appl. No.: 17/770,829

(22) PCT Filed: Aug. 13, 2021

(86) PCT No.: PCT/KR2021/010786
§ 371 (c)(1),
(2) Date: Apr. 21, 2022

(87) PCT Pub. No.: WO2022/039448
PCT Pub. Date: Feb. 24, 2022

(65) Prior Publication Data
US 2022/0393144 A1    Dec. 8, 2022

(30) Foreign Application Priority Data
Aug. 21, 2020 (KR) .................. 10-2020-0105343

(51) Int. Cl.
*H01M 4/04* (2006.01)
*H01M 4/139* (2010.01)
(Continued)

(52) U.S. Cl.
CPC ....... *H01M 4/0445* (2013.01); *H01M 4/0416* (2013.01); *H01M 4/139* (2013.01); *H01M 10/058* (2013.01); *H01M 2004/027* (2013.01)

(58) Field of Classification Search
CPC .. H01M 4/0445; H01M 4/0416; H01M 4/139; H01M 10/058; H01M 2004/027
See application file for complete search history.

(56) References Cited

U.S. PATENT DOCUMENTS 9,598,789 B2    3/2017  Grant et al.
2008/0145569 A1  6/2008  Behrens et al.
(Continued)

FOREIGN PATENT DOCUMENTS

CN   107123785 A   9/2017
JP   6-140027 A    5/1994
(Continued)

OTHER PUBLICATIONS

JP6497091 English translation. Naoi. Japan. Apr. 10, 2019. (Year: 2019).*
(Continued)

*Primary Examiner* — Christopher P Domone
(74) *Attorney, Agent, or Firm* — Birch, Stewart, Kolasch & Birch, LLP (57) ABSTRACT

An apparatus for pre-lithiating a negative electrode includes a pre-lithiation reactor having a pre-lithiation solution accommodated therein, a high-pressure chamber surrounding the pre-lithiation reactor, wherein an internal air pressure of the high-pressure chamber is configured to exceed atmospheric pressure, at least one lithium metal counter electrode disposed in the pre-lithiation solution, the lithium metal counter electrode being disposed to face a negative electrode receivable in the pre-lithiation solution in a state that the lithium metal counter electrode is spaced apart from the
(Continued)

negative electrode by a predetermined interval, and a charge and discharge unit being connectable to the negative electrode and the lithium metal counter electrode to provide a circuit.

14 Claims, 3 Drawing Sheets

(51) Int. Cl.
*H01M 10/058* (2010.01)
*H01M 4/02* (2006.01)

(56) References Cited

U.S. PATENT DOCUMENTS

| | | | |
|---|---|---|---|
| 2013/0327648 A1 | 12/2013 | Grant et al. | |
| 2016/0111710 A1 | 4/2016 | Momo et al. | |
| 2017/0077490 A1* | 3/2017 | Zhang | H01M 4/133 |
| 2019/0393480 A1* | 12/2019 | Brevnov | H01M 4/1393 |
| 2021/0066703 A1 | 3/2021 | Kim et al. | |
| 2021/0184199 A1* | 6/2021 | He | H01M 4/134 |
| 2021/0384485 A1 | 12/2021 | Chae et al. | |

FOREIGN PATENT DOCUMENTS

| | | |
|---|---|---|
| JP | 2002-343744 A | 11/2002 |
| JP | 2007-146213 A | 6/2007 |
| JP | 2008-16199 A | 1/2008 |
| JP | 4733179 B2 | 7/2011 |
| JP | 5792975 B2 | 10/2015 |
| JP | 2016-81926 A | 5/2016 |
| JP | 2016-139624 A | 8/2016 |
| JP | 2016-143711 A | 8/2016 |
| JP | 2018-98021 A | 6/2018 |
| JP | 6425562 B2 | 11/2018 |
| KR | 2008-288016 A | 11/2008 |
| KR | 10-2014-0106645 A | 9/2014 |
| KR | 10-2019-0083304 A | 7/2019 |
| KR | 10-2020-0030482 A | 3/2020 |
| KR | 10-2020-0046944 A | 5/2020 |
| KR | 10-2020-0053300 A | 5/2020 |
| KR | 10-2020-0095039 A | 8/2020 |
| WO | WO 2020/098177 A1 | 5/2020 |
| WO | WO 2020/153790 A1 | 7/2020 |

OTHER PUBLICATIONS

JP2002343744 English translation. Miyagawa. Japan. Nov. 29, 2002. (Year: 2002).*
International Search Report (PCT/ISA/210) issued in PCT/KR2021/010786, dated Dec. 3, 2021.

* cited by examiner

[FIG. 1]

CONVENTIONAL ART

APPARATUS FOR PRE-LITHIATION OF NEGATIVE ELECTRODE AND METHOD FOR PRE-LITHIATION OF NEGATIVE ELECTRODE

TECHNICAL FIELD

This application claims the benefit of priority based on Korean Patent Application No. 10-2020-0105343, filed on Aug. 21, 2020, and the entire contents of the Korean patent application are incorporated herein by reference.

The present invention relates to an apparatus and method for pre-lithiating a negative electrode. More specifically, the present invention relates to an apparatus for pre-lithiating a negative electrode, including a high-pressure chamber, and a method for pre-lithiating a negative electrode.

BACKGROUND ART

Recently, secondary batteries capable of charging and discharging have been widely used as energy sources of wireless mobile devices. In addition, the secondary battery has attracted attention as an energy source of an electric vehicle, a hybrid electric vehicle, etc., which are proposed as a solution for air pollution of existing gasoline vehicles and diesel vehicles using fossil fuel. Therefore, the types of applications using the secondary battery are currently much diversified due to the advantages of the secondary battery, and it is expected that the secondary battery will be applied to many fields and products in the future.

Such secondary batteries may be classified into lithium ion batteries, lithium ion polymer batteries, lithium polymer batteries, etc., depending on the composition of the electrode and the electrolyte, and among them, the amount of use of lithium-ion polymer batteries that are less likely to leak electrolyte and are easy to manufacture is on the increase. In general, secondary batteries are classified into cylindrical batteries and prismatic batteries in which an electrode assembly is embedded in a cylindrical or rectangular metal can, depending on the shape of a battery case, and pouch-type batteries in which the electrode assembly is embedded in a pouch-type case of an aluminum laminate sheet. The electrode assembly built into the battery case is composed of a positive electrode, a negative electrode, and a separator interposed between the positive electrode and the negative electrode, and is a power generating element capable of charging and discharging. The electrode assembly is classified into a jelly-roll type wound with a separator interposed between the positive electrode and the negative electrode which are long sheet-shaped and are coated with active materials, and a stack type in which a plurality of positive electrodes and negative electrodes of a predetermined size are sequentially stacked while a separator is interposed therebetween.

The positive electrode and the negative electrode are formed by applying a positive electrode slurry containing a positive electrode active material and a negative electrode slurry containing a negative electrode active material to a positive electrode current collector and a negative electrode current collector, to thereby form a positive electrode active material layer and a negative electrode active material layer, respectively, followed by drying and rolling them.

In the case of such a negative electrode, a passive film such as a solid electrolyte interface (SEI) layer is formed on the surface of the negative electrode during the initial charge. The passive film interrupts injection of the organic solvent into the negative electrode and suppress decomposition reaction of the organic solvent, thereby stabilizing the structure of the negative electrode, improving the reversibility of the negative electrode, and allowing the negative electrode to be usable. However, since the formation reaction of the passive film is an irreversible reaction, the consumption of the lithium ions is caused, thereby decreasing the capacity of the battery, and as the battery cycle is repeated, the lithium ions are consumed, thereby causing capacity reduction and cycle lifespan reduction.

As such, a method for forming a passive film on the surface of a negative electrode, preventing the capacity reduction and improving cycle lifespan by pre-lithiating the negative electrode through inserting lithium into the negative electrode is currently developed. Such a pre-lithiation method includes a physical method of allowing lithium metal to directly contact the surface of the negative electrode, and a method of connecting lithium metal with the negative electrode and electrochemically charging the negative electrode.

Figure 1:
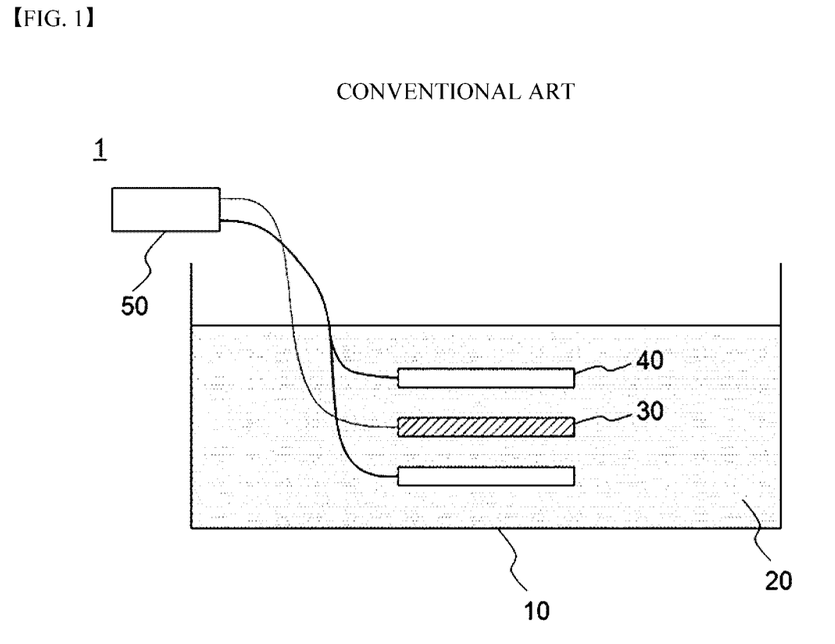
FIG. 1 is a schematic diagram showing a configuration of a conventional pre-lithiating apparatus.

FIG. 1 is a schematic diagram showing a configuration of a conventional pre-lithiating apparatus.

Referring to FIG. 1, in a conventional pre-lithiating apparatus 1, a negative electrode 30 and a lithium metal counter electrode 40 are disposed in a pre-lithiation reactor 10 where a pre-lithiation solution 20 is accommodated, which are then electrically connected through a charge and discharge unit 50, to thereby be charged. At this time, the negative electrode may have a structure where a negative electrode active material layer has been formed on two surfaces of the current collector. In this case, in order to pre-lithiate all of negative electrode active material layers of the two surfaces, lithium metal may be disposed on two surfaces of the negative electrode.

At this time, the pre-lithiation solution is obtained by dissolving lithium salt in an organic solvent and allows movement of ions between the negative electrode and the lithium metal counter electrode. Further, the mixture of various kinds may be used as the organic solvent. In this case, as the elements having a high volatility in the organic solvent are volatilized, the composition ratio of the pre-lithiation solution is changed during the pre-lithiation process. In this case, when the pre-lithiation process is performed for a long time, an organic solvent having a high volatility is more volatilized, thereby increasing the ratio of an organic solvent having a low volatility in the electrolyte solution.

Since electrochemical pre-lithiation is generally performed in an open water tank using a pre-lithiation solution, the pre-lithiation solution, which is exposed to the atmosphere, is continually volatilized. The volatilization of a solvent changes of the ratio of solvents of a pre-lithiation solution, which accordingly lowers the degree of dissociation of lithium salt. The concentration of lithium salt in the pre-lithiation solution increases due to an additionally reduced solvent, and lithium salt may be partly precipitated in the negative electrode by series of processes. This may cause a local resistance increase in the electrode, thereby causing non-uniform pre-lithiation of the electrode. Such non-uniform pre-lithiation can reduce the initial efficiency and cycle characteristics of the battery. Additionally, the composition of the electrolyte solution, which has been changed by the solvent which has been volatilized during the continuous pre-lithiation, changes the shape and constituents of the SEI film initially formed in the pre-lithiation, thereby causing a deviation between pre-lithiated electrodes and hindering mass production.

Therefore, there is a need for a technology for maintaining the composition of the pre-lithiation solution constant during the pre-lithiation process.

DISCLOSURE

Technical Problem

The present invention is believed to solve at least some of the above problems. For example, an aspect of the present invention provides a negative electrode pre-lithiating apparatus and method capable of preventing non-uniform pre-lithiation by maintaining the composition of the pre-lithiation solution constant and preventing reduction of the quality of the negative electrode by forming a uniform and stable SEI film.

Technical Solution

An apparatus for pre-lithiating a negative electrode according to the present invention includes: a pre-lithiation reactor having a pre-lithiation solution is-accommodated therein; a high-pressure chamber surrounding the pre-lithiation reactor and where an internal air pressure of the high-pressure chamber is configured to exceed atmospheric pressure; at least one lithium metal counter electrode disposed in the pre-lithiation solution, the lithium metal counter electrode being disposed to face a negative electrode receivable in the pre-lithiation solution in a state that the lithium metal counter electrode is spaced apart from the negative electrode terminal by a predetermined interval; and a charge and discharge unit being connectable to the negative electrode and the lithium metal counter electrode to provide a circuit.

In a specific example, the apparatus further includes a transfer unit which transfers the negative electrode into the pre-lithiation reactor or removes the negative electrode from the pre-lithiation reactor.

Herein, the transfer unit may include a transfer roll supports a lower surface of the negative electrode and moves the negative electrode through rotary motion.

In a specific example, the internal air pressure of the high-pressure chamber may be 1.1 to 10 atm.

Further, the apparatus may further include an air blower which supplies gas to an interior of the high-pressure chamber.

The gas is at least one inert gas selected from the group consisting of argon (Ar), neon (Ne), helium (He) and nitrogen ($N_2$).

In a specific example, the high-pressure chamber includes an opening through which the negative electrode is inserted into the high-pressure chamber or through which the negative electrode is removed from the high-pressure chamber.

In a specific example, the apparatus further includes a sealing member which seals a gap between the opening and the negative electrode.

The sealing member may be made of silicon rubber.

Further, the present invention provides a method of pre-lithiating a negative electrode by using the above-described apparatus for pre-lithiating a negative electrode. The method includes: preparing a negative electrode and the above-described apparatus for pre-lithiating the negative electrode; moving the negative electrode into the pre-lithiation reactor in the high-pressure chamber and immersing the negative electrode in the pre-lithiation solution such that the negative electrode is spaced apart from the at least one lithium metal counter electrode; sealing the high-pressure chamber and injecting gas into the high-pressure chamber to cause an internal air pressure in the high-pressure chamber to exceed atmospheric pressure; and pre-lithiating the negative electrode by charging and discharging the negative electrode to provide a pre-lithiated negative electrode.

In a specific example, the internal air pressure of the high-pressure chamber may be 1.1 to 10 atm.

The gas is at least one inert gas selected from the group consisting of argon (Ar), neon (Ne), helium (He) and nitrogen ($N_2$).

In a specific example, the method further includes removing the pre-lithiated negative electrode from the high-pressure chamber, and washing and drying the pre-lithiated negative electrode.

Further, the present invention provides a method for manufacturing a secondary battery including the above-described method of pre-lithiating a negative electrode.

Advantageous Effects

According to the present invention, it is possible to prevent the change in the composition of the pre-lithiation solution by volatilization of the pre-lithiation solution during pre-lithiation by preparing a high-pressure chamber surrounding the external side of the pre-lithiation reactor and injecting gas to allow the internal air pressure of the high-pressure chamber to exceed the atmospheric pressure. This can prevent non-uniform pre-lithiation and improve initial efficiency and cycle characteristics of a battery.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features, numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, the present invention will be described in detail with reference to the drawings.

Figure 2:
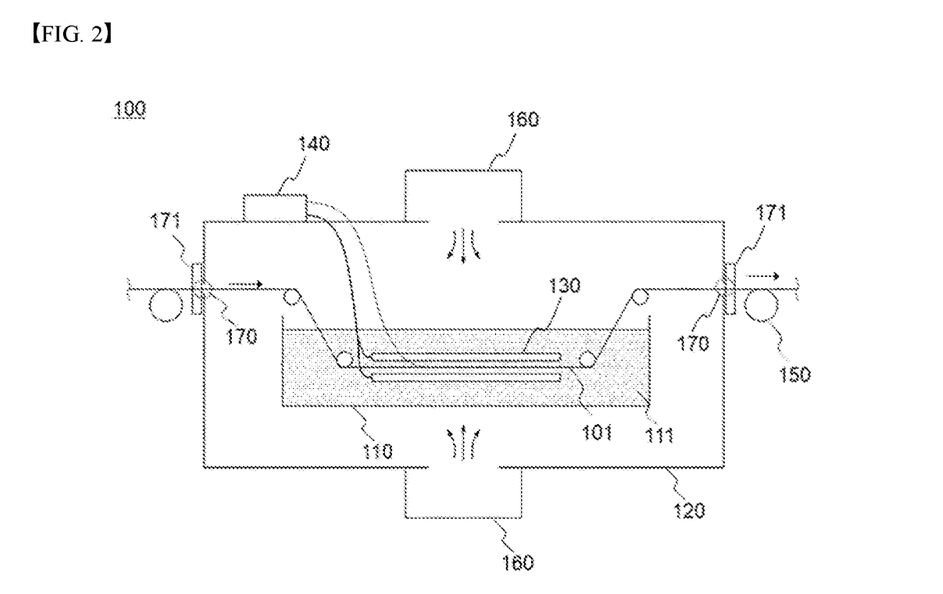
FIG. 2 is a schematic diagram illustrating a configuration of an apparatus for pre-lithiating a negative electrode according to the present invention.

FIG. 2 is a schematic diagram illustrating a configuration of an apparatus for pre-lithiating a negative electrode according to the present invention.

Referring to FIG. 2, an apparatus for pre-lithiating a negative electrode according to the present invention includes: a pre-lithiation reactor 110 where a pre-lithiation solution 111 is accommodated therein; a high-pressure chamber 120 which surrounds an external side of the pre-lithiation reactor 110 and where an internal air pressure exceeding an atmospheric pressure is maintained; at least one lithium metal counter electrode 130 which is disposed in the pre-lithiation solution 111 and is disposed to face a negative electrode 101 inputted to the pre-lithiation solution 111 in a state spaced apart with a predetermined interval; and a charge and discharge unit 140 which is circuit-connected to the negative electrode 101 and the lithium metal counter electrode 130.

As described above, as elements having a high volatility are volatilized among organic solvents during the pre-lithiation process, the composition ratio of solvents constituting the pre-lithiation solution is changed during the pre-lithiation process, and the degree of dissociation of lithium salt is lowered. In this case, in the pre-lithiation solution, the concentration of the lithium salt increases, and as lithium salt is partly precipitated in the negative electrode, pre-lithiation can be non-uniformly performed. Further, the change in composition of the pre-lithiation solution can change the shape and constituents of the SEI film.

For example, the pre-lithiation solution can include ethylene carbonate (EC) and diethyl carbonate (DEC) which are mainly used as the electrolyte solution of a secondary battery. In this case, since the vapor pressure ($1.31579 \times 10^{-5}$ atm) of the ethylene carbonate is greater than the vapor pressure ($7 \times 10^{-1}$ atm) of the diethyl carbonate, diethyl carbonate is more volatilized when pre-lithiation is performed as time goes by. As such, the ratio of the diethyl carbonate in the electrolyte solution decreases, and as the concentration of the lithium salt increases, the degree of dissociation of lithium ions decreases. As a result, the lithium salt is partially precipitated in the negative electrode during the pre-lithiation process. Such lithium salt can cause non-uniformity of electrode preprocessing and may act as a local resistance element of the electrode.

According to the present invention, it is possible to prevent the change in the composition of the pre-lithiation solution by volatilization of the pre-lithiation solution during pre-lithiation by preparing a high-pressure chamber surrounding the external side of the pre-lithiation reactor and injecting gas to allow the internal air pressure of the high-pressure chamber to exceed the atmospheric pressure. This can prevent non-uniform pre-lithiation and improve initial efficiency and cycle characteristics of a battery.

Further, in the specification of the present invention, the direction, in which the negative electrode is moved in the pre-lithiation reactor, is defined as the moving direction, and a direction, which is perpendicular to the moving direction on the plane formed by the negative electrode, can be defined as a width direction.

<Pre-Lithiation Apparatus>

Hereinafter, the configuration of an apparatus for pre-lithiating a negative electrode according to the present invention will be described in detail.

Referring to FIG. 2, the pre-lithiation apparatus 100 of the negative electrode according to the present invention includes a pre-lithiation reactor 110 for accommodating a pre-lithiation solution 111 therein. The pre-lithiation reactor 110 provides a space where pre-lithiation reaction occurs, and lithium ions can be inserted into the negative electrode during the process in which the negative electrode is electrochemically charged in the pre-lithiation solution 111.

The size, shape, etc. of the pre-lithiation reactor 110 can be appropriately designed according to the size of the negative electrode to be described later, the number of negative electrodes to be injected, and the moving distance of the negative electrode, etc.

The pre-lithiation solution 111 may contain a lithium salt and an organic solvent.

Specifically, the lithium salt may contain at least one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, (FSO$_2$)$_2$NLi, chloro boran lithium, low aliphatic carboxylic acid lithium, and 4 phenyl boric acid lithium.

For example, the organic solvent may contain at least one selected from the group consisting of a carbonate solvent and an ester-based solvent. The non-aqueous solvent may contain at least one selected from the group consisting of propylene carbonate (PC), ethylene carbonate (EC), diethyl carbonate (DEC), dimethylcarbonate (DMC), dipropyl carbonate (DPC), dimethylsulfoxide, acetonitrile, dimethoxyethane, diethoxyethane, tetrahydrofuran, N-methyl-2-pyrrolidone (NMP), ethyl methylcarbonate (EMC), gamma butyrolactone (g-butyrolactone), ethyl propionate, methyl propionate, but the present invention is not limited thereto.

Further, the pre-lithiation solution may further contain an additive, and the additive may include at least one selected from the group consisting of vinylene carbonate, vinylethylene carbonate, fluoroethylene carbonate, salicylic acid, LiBF4, LITFSI (Lithium bis(trifluoromethanesulfonyl)imide), LiBOB (Lithium bis(oxalato)borate), and LiODFB (Lithium difluoro(oxalato)borate).

Further, the temperature of the pre-lithiation solution may be 10 to 80° C., specifically 20 to 60° C., and more specifically 25 to 40° C. When pre-lithiation is performed in the above temperature range, lithium can be smoothly diffused.

Specifically, a negative electrode 101 is accommodated in a pre-lithiation solution 111 in the pre-lithiation reactor 110. The negative electrode 101 may be in a state before being cut in the unit electrode size. In this case, the negative electrode 101 is wound on a negative electrode roll (not shown) provided separately from the external side of the pre-lithiation reactor 110. When pre-lithiation is performed, the negative electrode 101 may be unwound from the negative electrode roll and be inserted into the pre-lithiation reactor 110.

However, in this case, the negative electrode, which has been cut in the unit electrode size, may be used. In this case, after a plurality of negative electrodes are accommodated in one pre-lithiation reactor at one time, pre-lithiation may be performed for each negative electrode.

The negative electrode 101 has a structure in which a negative electrode active material layer is formed on at least one surface of the negative electrode current collector.

Further, a non-coated part for forming a negative electrode tab may be formed at one side of the negative electrode active material layer. At this time, a negative electrode slurry containing a negative electrode active material is applied and is then dried and rolled to thereby form a negative electrode active material layer. The negative electrode slurry may further include conductive materials and binders.

The sheet for the negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

The negative electrode active material may contain at least one selected from the group consisting of a carbon-based active material and a silicon-based active material.

The silicon-based active material may impart excellent capacity characteristics to the negative electrode or secondary battery of the present invention and may contain a compound represented by $SiO_x$ ($0 \leq x < 2$). Since $SiO_2$ does not react with lithium ions, lithium cannot be stored, and thus x is preferably in the above range. More preferably, the silicon-based oxide may be SiO. The average particle diameter ($D_{50}$) of the silicon-based oxide may be 1 to 30 μm, and preferably 3 to 15 μm in terms of reducing side reaction with the electrolyte solution while maintaining structural stability during charge/discharge. The average particle diameter $D_{50}$ may be measured using, for example, a laser diffraction method.

The carbon-based active material may impart excellent cycle characteristics or battery lifespan performance to a secondary battery or a negative electrode for a secondary battery of the present invention. Specifically, the carbon-based active material may contain at least one selected from the group consisting of artificial graphite, natural graphite, hard carbon, soft carbon, carbon black, acetylene black, Ketjen black, super P, graphene and textile carbon, and preferably at least one selected from the group consisting of artificial graphite and natural graphite. The average particle diameter ($D_{50}$) of the carbon-based oxide may be 10 to 30 μm, and preferably 15 to 25 μm in terms of reducing side reaction with the electrolyte solution while maintaining structural stability during charge/discharge.

Specifically, both the silicon-based active material and the carbon-based active material may be used as the negative electrode active material in terms of improving both the capacity characteristics and cycle characteristics. Specifically, the negative electrode active material may include the carbon-based active material and the silicon-based active material in the weight ratio of 50:50 to 95:5, and preferably in the weight ratio of 60:40 to 80:20.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The negative electrode 101 can be pre-lithiated by being charged and discharged by a charge and discharge unit 140 in a state that is connected to a lithium metal counter electrode 130 to be described later.

Further, the apparatus 100 for pre-lithiating a negative electrode according to the present invention further includes a transfer unit 150 which transfers the negative electrode 101 to the pre-lithiation reactor 110 or takes the negative electrode 101 out of the pre-lithiation reactor 110.

Specifically, the transfer unit 150 supports the negative electrode 101 on the lower surface of the negative electrode 101 and includes at least one transfer roll which moves the negative electrode through rotary motion.

Through this, the negative electrode 101, which is unwound from the negative electrode roll, may be continually inserted into and taken out from the pre-lithiation reactor 110. As such, the transfer of the negative electrode can become simple.

The transfer roll may allow the negative electrode to be immersed in the pre-lithiation solution 111 as the negative electrode 101 is designed to be moved in the pre-lithiation solution 111 in the pre-lithiation reactor 110.

The size, shape and number of transfer rolls constituting the transfer unit 150 may be appropriately determined according to the size and number of negative electrodes 101 and the size and shape of the pre-lithiation reactor 110.

Some of the transfer rolls may be located outside a high-pressure chamber 120 to be described later, some others of the transfer rolls may be located outside the pre-lithiation solution 111 in the high-pressure chamber 120, and some others of the transfer rolls may be located in the pre-lithiation solution 111 to thereby allow the negative electrode 101 to be moved in the pre-lithiation solution 111.

Further, the apparatus 100 for pre-lithiating a negative electrode according to the present invention includes a high-pressure chamber 120 which surrounds the external side of the pre-lithiation reactor 110. As the high-pressure chamber 120 maintains the internal air pressure exceeding the atmospheric pressure, it is possible to suppress the volatilization of the pre-lithiation solution 111 and prevent the change in the composition of the pre-lithiation solution 111. Through this, non-uniform pre-lithiation can be prevented, and initial efficiency and cycle characteristics of the battery can be improved.

Herein, the internal air pressure of the high-pressure chamber 120 may be 1.1 to 10 atm. Specifically, the internal air pressure of the high-pressure chamber 120 may be 1.1 to 5 atm, and more specifically 1.1 to 3 atm. When the internal air pressure of the high-pressure chamber 120 is in the above range, the volatilization of the pre-lithiation solution 111 in the pre-lithiation reactor 110 can be easily suppressed. When the internal air pressure of the high-pressure chamber 120 is less than 1.1 atm, it may be difficult to suppress the volatilization of the pre-lithiation solution 111, and when the internal air pressure of the high-pressure chamber 120 exceeds 10 atm, the internal air pressure of the high-pressure chamber 120 may become excessively high, thereby increasing incidental expenses which are spent to prevent deformation of the high-pressure chamber 120 according to the internal air pressure.

Likewise, since the inside of the high-pressure chamber 120 should maintain the air pressure exceeding atmospheric pressure, the high-pressure chamber 120 is preferably made of a high-strength material capable of preventing deformation according to the pressure. For example the high-pressure chamber 120 may be made of steel or stainless steel (SUS).

Further, in order to maintain the high pressure in the high-pressure chamber 120, gas may be allowed to be circulated in the high-pressure chamber 120. For this purpose, the apparatus 100 for pre-lithiating the negative electrode further includes an air blower 160 which supplies gas into the high-pressure chamber 120. The air blower 160 may receive gas from an external gas supply source (not shown).

At least one air blower 160 may be installed on the outer surface of the high-pressure chamber 120. For example, air blowers 160 may be installed on the upper surface and the lower surface of the high-pressure chamber 120, respectively. Alternatively, only one air blower 160 may be installed on the upper surface of the high-pressure chamber 120, or it may also be installed on the side surface of the high-pressure chamber 120 as well as the upper surface and the lower surface. In this case, a vent for allowing an inflow of air supplied from an air blower 160 may be formed in the high-pressure chamber 120. Further, in the case that the air blower 160 is installed on both of the upper surface and the lower surface of the high-pressure chamber 120, the pre-lithiation reactor 110 may be made to be spaced apart by a predetermined distance from the lower surface of the high-pressure chamber 120. To this end, a support (not shown) for supporting the pre-lithiation reactor 110 may be formed.

At this time, gas, which does not react with the pre-lithiation solution 111, can be used. Specifically, the gas may be at least one inert gas selected from the group consisting of argon (Ar), neon (Ne), helium (He) and nitrogen ($N_2$).

Further, an opening 170, which is used when inserting the negative electrode 101 or taking the negative electrode 101 out, may be formed in the high-pressure chamber 120. The opening 170 may be formed at two sides of the high-pressure chamber 102. There is no particular limitation to the shape and size of the opening 170 as long as it can be used when inserting the negative electrode 101 or taking the negative electrode 101 out, but it is preferable to make the area of the opening 170 small to prevent the leakage of internal gas. For example, the opening 170 may have a slit shape which allows the passage of the negative electrode 101.

Nevertheless, a gap may be formed between the opening 170 and the negative electrode 101 transferred into the high-pressure chamber, and internal gas may be leaked from the gap. In order to prevent the leakage, the apparatus 100 for pre-lithiating the negative electrode according to the present invention further includes a sealing member 171 which seals a gap between the opening 170 and the negative electrode 101.

There is no particular limitation to the shape of the sealing member 171. For example, the sealing member 171 may have a ring shape that surrounds the negative electrode 101. The sealing member 171 opens the opening 170 while the negative electrode 101 is transferred to be inserted into the pre-lithiation reactor 110, and when the negative electrode 101 is inserted into the pre-lithiation reactor 110, the sealing member 171 is contracted or compressed to thereby block a gap between the opening 170 and the negative electrode 101. Further, the negative electrode is a long shape which is wound from a negative electrode roll and pre-lithiation may be completed by several times of pre-lithiation. Specifically, the negative electrode may be divided into sections having a length which may be accommodated in a pre-lithiation solution, and the pre-lithiation may be performed for each section. In this case, when one section of the negative electrode 101 is immersed in the pre-lithiation solution 111, the transfer of the negative electrode 101 is stopped, and the sealing member 120 is operated to seal the inside of the high-pressure chamber 120 to thereby perform pre-lithiation, and when the pre-lithiation is completed, the negative electrode 101 is transferred to immerse the next section in the pre-lithiation solution 111. In this way, the same process is repeated.

The sealing member 171 may be made of an elastic material to effectively prevent a gap between the opening 170 and the negative electrode 101. For example, the sealing member 171 may be made of silicon rubber. In this case, the sealing member 171 can be compressed and deformed in the gap between the opening 170 and the negative electrode 101 to thereby effectively block the gap.

Further, the present invention includes a lithium metal counter electrode 130 as a lithium supply source which supplies lithium ions into the negative electrode. The lithium metal counter electrode 130 can function as a counter electrode to the negative electrode 101 when electrochemically charged for pre-lithiation as the lithium metal counter electrode 130 is disposed to be spaced apart by a predetermined distance from the negative electrode 101 which is inserted into the pre-lithiation solution 111. The lithium metal counter electrode 130 may have a sheet form disposed to face the negative electrode. In the case of a negative electrode wherein the negative electrode active material layer is formed on two surfaces of the current collector, the lithium metal counter electrode 130 is disposed on two surfaces of the negative electrode in order to pre-lithiate the negative electrode active material layer.

The thickness of the lithium metal counter electrode 130 may be appropriately set in consideration of the pre-lithiation level, and may specifically be 10 to 500 μm, and more specifically be 40 to 200 μm.

The lithium metal counter electrode 130 can prevent a short circuit phenomenon which may occur by a direct contact between the negative electrode 101 and the lithium metal counter electrode 130 during electrochemical charge by being spaced apart from the negative electrode 101.

At this time, the separation distance between the lithium metal counter electrode 130 and the negative electrode 101 may be 1 to 20 mm. Specifically, the separation distance between the lithium metal counter electrode 130 and the negative electrode 101 may be 3 to 15 mm, and more specifically 6 to 12 mm. When the separation distance between the lithium metal counter electrode 130 and the negative electrode 101 is in the above range, it is possible to sufficiently prevent an electrode short circuit phenomenon which may occur by a direct contact between the negative electrode 110 and the lithium metal counter electrode 130, and lithium can be smoothly inserted into the negative electrode at the time of pre-lithiation.

Further, the apparatus 100 for pre-lithiating a negative electrode includes a charge and discharge unit 140 which is circuit-connected to the negative electrode 101 and the lithium metal counter electrode 130. The charge and discharge unit 140 applies predetermined current to the lithium metal counter electrode 130 and the negative electrode 101, to thereby pre-lithiate the negative electrode by electrochemical charge.

Further, FIG. 2 illustrates only a section where the negative electrode faces the lithium metal counter electrode and pre-lithiation is performed in the pre-lithiation reactor, but when necessary, an impregnation section where the negative electrode may be impregnated in the pre-lithiation solution before facing the lithium metal counter electrode, and an aging section where the negative electrode may be aged after the pre-lithiation of the negative electrode is completed may be prepared.

Further, the apparatus for pre-lithiating a negative electrode according to the present invention further includes a washing tank (not shown) including an organic solvent. The washing tank is arranged independently from the pre-lithiation reactor 110 and can be provided as a place for washing the negative electrode where pre-lithiation has been performed. At this time, the washing tank may be located in the high-pressure chamber 120 and may be located separately at the outside of the high-pressure chamber 120.

To this end, the negative electrode 101 may be transferred from the pre-lithiation reactor 110 to the washing tank through a transfer roll. Further, as there is a separate transfer roll in the washing tank, the negative electrode 101 may be moved in the organic solvent in the washing tank, through which impurities remaining in the negative electrode 101 may be removed. The organic solvent does not contain lithium salt, and the same one as the organic solvent used for the above-described pre-lithiation solution may be used. Specifically, at least one selected from the group consisting of dimethyl carbonate (DMC), ethylmethyl carbonate (EMC), and ethylene carbonate (EC) may be used as the organic solvent. The length of the washing tank may be appropriately designed according to the area of the negative electrode injected into the pre-lithiation reactor, the pre-lithiation time, and the size of the pre-lithiation reactor.

Further, an apparatus 100 for pre-lithiating a negative electrode according to the present invention further includes a drying unit (not shown) for drying a negative electrode which passes through the washing tank.

The drying unit may be provided as a place where the negative electrode 101, which has passed through the pre-lithiation reactor 110 and the washing tank, is dried. Likewise, the negative electrode 101 may be transferred from the washing tank to the drying unit by a transfer roll. In addition, the drying unit may include air or inert gas. The inert gas may be at least one selected from the group consisting of Ar, $N_2$ and He.

The temperature of the drying unit may be in the range of 10 to 80° C., specifically in the range of 20 to 60° C., and more specifically in the range of 25 to 40° C. This temperature range is preferable in that the oxidation of the negative electrode can be prevented, and the pre-lithiated state can be maintained in the range. The length of the drying unit or the moving distance of the negative electrode in the drying unit may be appropriately designed according to the number of negative electrodes injected into the pre-lithiation reactor, pre-lithiation time, and the size of the pre-lithiation reactor.

<Method of Pre-Lithiating Negative Electrode>

The present invention provides a method of pre-lithiating a negative electrode using the above-described apparatus for pre-lithiating a negative electrode.

Figure 3:
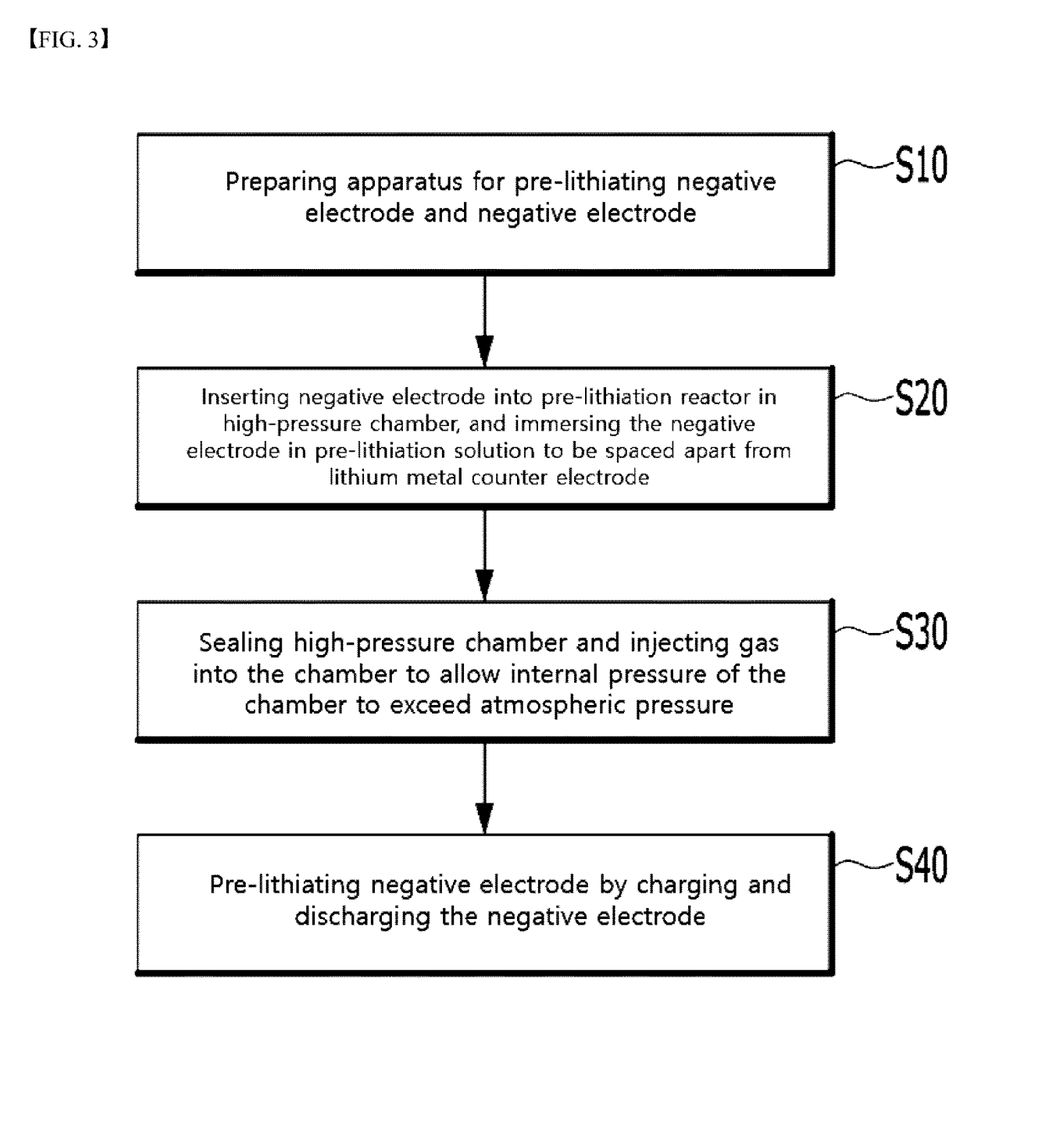
FIG. 3 is a flowchart illustrating the sequence of a method of pre-lithiating a negative electrode according to the present invention.

FIG. 3 is a flowchart illustrating the sequence of a method of pre-lithiating a negative electrode according to the present invention.

Referring to FIG. 3, a method of pre-lithiating a negative electrode according to the present invention includes: preparing a negative electrode and the above-described apparatus for pre-lithiating the negative electrode (S10); putting the negative electrode in a pre-lithiation reactor in a high-pressure chamber and immersing the negative electrode in a pre-lithiation solution to be spaced apart from at least one lithium metal counter electrode (S20); sealing the high-pressure chamber and injecting gas into the high-pressure chamber to allow an air pressure in the high-pressure chamber to exceed an atmospheric pressure (S30); and pre-lithiating the negative electrode by charge and discharge (S40).

According to the present invention, it is possible to prevent the change in the composition of the pre-lithiation solution by volatilization of the pre-lithiation solution during pre-lithiation by preparing a high-pressure chamber surrounding the external side of the pre-lithiation reactor and injecting gas to allow the internal air pressure of the high-pressure chamber to exceed the atmospheric pressure. This can prevent non-uniform pre-lithiation and improve initial efficiency and cycle characteristics of a battery.

Referring to FIG. 3 together with FIG. 2, first, a negative electrode 101 and an apparatus 100 for pre-lithiating a negative electrode are prepared. The negative electrode 101 and the apparatus 100 for pre-lithiating the negative electrode, which have been used in the above description, may be used. Further, the negative electrode may be in a state that has been wound in a negative electrode roll installed outside the pre-lithiation reactor.

If the negative electrode 101 and the apparatus 100 for pre-lithiating a negative electrode are prepared, the negative electrode 101 is unwound from the negative electrode roll and is then transferred through a transfer roll. As such, the negative electrode 101 passes through the opening 170 formed on the high-pressure chamber 120 and is then injected into the pre-lithiation reactor 110.

If the negative electrode is injected into the pre-lithiation reactor 110, the transfer of the negative electrode is stopped, and the sealing member 171 is operated to seal the high-pressure chamber 120. Thereafter, gas is injected into the high-pressure chamber 120 using an air blower 160 in order to allow the internal air pressure of the high-pressure chamber 120 to exceed the atmospheric pressure. Through this, it is possible to suppress the volatilization of the pre-lithiation solution 111 and prevent the change of the composition of the pre-lithiation solution 111. As a result, non-uniform pre-lithiation can be prevented, and initial efficiency and cycle characteristics of the battery can be improved.

At this time, the internal air pressure of the high-pressure chamber 120 may be 1.1 to 10 atm. Specifically, the internal air pressure of the high-pressure chamber 120 may be 1.1 to 5 atm, and more specifically 1.1 to 3 atm. When the internal air pressure of the high-pressure chamber 120 is in the above range, the volatilization of the pre-lithiation solution 111 in the pre-lithiation reactor 110 can be easily suppressed. When the internal air pressure of the high-pressure chamber 120 is less than 1.1 atm, it may be difficult to suppress the volatilization of the pre-lithiation solution, and when the internal air pressure of the high-pressure chamber 120 exceeds 10 atm, the internal air pressure of the high-pressure chamber 120 may become excessively high, thereby increasing incidental expenses which are spent to prevent deformation of the high-pressure chamber 120 according to the internal air pressure. The gas is at least one inert gas selected from the group consisting of argon (Ar), neon (Ne), helium (He) and nitrogen ($N_2$).

If the internal air pressure of the high-pressure chamber 120 reaches the targeted numerical value, pre-lithiation is performed by charging and discharging the negative electrode 101. As described above, the negative electrode may be divided into several sections having a length which may be accommodated in the pre-lithiation solution, and then pre-lithiation may be performed. In this case, when one section of the negative electrode 101 is immersed in the pre-lithiation solution 111, the transfer of the negative electrode 101 is stopped, and the sealing member 120 is operated to seal the inside of the high-pressure chamber 120 to thereby perform pre-lithiation, and when the pre-lithiation is completed, the negative electrode 101 is transferred to immerse the next section in the pre-lithiation solution 111. In this way, the same process is repeated. After the negative electrode 101 is injected into the pre-lithiation reactor 110, the negative electrode 101 is electrically connected in a state that faces the lithium metal counter electrode 130.

At this time, the step of impregnating the negative electrode 101 in the pre-lithiation solution 110 may be performed before performing pre-lithiation. In this case, the negative electrode 101 may be left unattended in the pre-lithiation solution for a predetermined time. As described above, a separate impregnation section can be prepared in the pre-lithiation reactor 110.

In this case, the impregnation time may be appropriately set according to the pre-lithiation condition. For example, it may be 5 to 120 minutes, specifically 10 to 90 minutes, and more specifically 15 to 40 minutes. Through this, as the negative electrode becomes sufficiently set in the pre-lithiation solution, the pre-lithiation may be uniformly performed in the negative electrode. When the impregnation time exceeds the above range, the durability of the negative electrode decreases and the active material may be easily detached from the current collector. When the impregnation time is not within the range, it is difficult for the pre-lithiation solution to be sufficiently permeated into the negative electrode and it may become difficult for the pre-lithiation to be uniformly performed.

Further, when the pre-lithiation reaction is completed by charging and discharging the negative electrode, the aging step can be further performed. Herein, the aging is a process of leaving the negative electrode 101 unattended in the pre-lithiation solution 111 for a predetermined time. As described above, a separate aging section can be prepared in the pre-lithiation reactor 110.

In this process, lithium ions inserted by pre-lithiation can be more uniformly diffused to the inside and the surface of the negative electrode active material. If the aging step is not performed after the pre-lithiation, the lithium ions may not be uniformly diffused in the negative electrode active material, thereby making it difficult to sufficiently remove the irreversible capacity, and there is a possibility that the uniform charge/discharge may not occur after preparation of the negative electrode. The aging time can be appropriately designed according to the pre-lithiation time.

Further, the method of pre-lithiating a negative electrode according to the present invention further includes taking the pre-lithiated negative electrode 101 out of the high-pressure chamber 120, and washing and drying the pre-lithiated negative electrode 101. Specifically, the negative electrode 101, which has been taken out from the high-pressure chamber, may be washed while moved in the organic solvent in the washing tank. The organic solvent does not contain lithium salt, and the same one as the organic solvent used for the above-described pre-lithiation solution 111 may be used.

Thereafter, the negative electrode having passed through the washing tank is transferred to the drying unit and is dried. The organic solvent remaining in the negative electrode may be removed by the impregnation, pre-lithiation, aging and/or washing processes by the drying step. The drying step may be performed by air or inert gas. Specifically, the inert gas may be at least one selected from the group consisting of Ar, $N_2$ and He.

The time, which is spent for the washing step and the drying step, may be appropriately designed according to the pre-lithiation time.

The negative electrode, which has been washed and dried, may be collected and used to prepare a secondary battery.

<Secondary Battery>

Further, the present invention provides a method for manufacturing a secondary battery including the above-described method of pre-lithiating a negative electrode.

The secondary battery has a form where an electrode assembly, which has a form that a separator is interposed between a positive electrode and a negative electrode, is accommodated in a battery case. The positive electrode has a structure that a positive electrode active material layer is formed as a positive electrode slurry containing a positive electrode active material is applied on a positive electrode current collector, and the negative electrode is as described above.

In the present invention, the positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

In the present invention, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \le y \le 0.7$); lithium nickel cobalt manganese composite oxide represented by the formula $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \le z \le 0.5$, $0.1 \le b \le 0.8$, $0.1 \le c \le 0.8$, $0 \le d \le 0.2$, $0 \le e \le 0.2$, $b+c+d<1$, M=Al, Mg, Cr, Ti, Si or Y, and A=F, P or Cl); olivine-based lithium metal phosphate represented by the formula $Li_{1+x}M_{1-y}M'_yPO_{4-z}X_z$ (wherein M=transition metal, preferably Fe, Mn, Co or Ni, M'=Al, Mg or Ti, X=F, S or N, and $-0.5 \le x \le 0.5$, $0 \le y \le 0.5$, $0 \le z \le 0.1$).

Further, the positive electrode slurry further contains a conductive material and a binder as well as a positive electrode active material, which is as described above.

The separator is interposed between the positive electrode and the negative electrode, and an insulating thin film having high ion permeability and mechanical strength is used. The pore diameter of the separator is generally 0.01 to 10 micrometers, and the thickness is generally 5 to 300 micrometers. Examples of such a separator include olefin-based polymers such as polypropylene which is chemically resistant and hydrophobic; a sheet or a nonwoven fabric made of glass fiber, polyethylene or the like. When a solid electrolyte such as a polymer is used as the electrolyte, the solid electrolyte may also serve as a separator.

Further, the battery case is not particularly limited as long as it is used as an exterior material for packaging the battery, and a cylindrical, square, or pouch type may be used and specifically a pouch-type battery case may be used. The pouch-type battery case is generally made of an aluminum laminate sheet and may be composed of an inner sealant layer for sealing, a metal layer for preventing permeation of materials, and an external resin layer forming the outermost part of the case. Details of the battery case are known to those of ordinary skill in the art, and thus detailed description thereof will be omitted.

When an electrode assembly is accommodated in a battery case, the electrolyte solution is injected and sealed. Thereafter, a final secondary battery is manufactured through the formation process. Details about the electrolyte solution are known to those of ordinary skill in the art, and thus detailed description thereof will be omitted.

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

Example 1

<Preparation of Negative Electrode>

85.1 wt % of graphite and 9.5 wt % of SiO as the negative electrode active material, 1.3 wt % of Denka black as the conductive material, 3.0 wt % of SBR as the binder, and 1.1 wt % of CMC as the thickener were added to water to thereby prepare a negative electrode slurry.

The negative electrode slurry was coated on both surfaces of the copper current collector (thickness: 8 μm), which was then rolled and dried at a vacuum oven of 130° C. and rolled, to thereby form a negative electrode active material layer on both surfaces of the copper negative electrode current collector to thereby manufacture a negative electrode.

The negative electrode was wound on a negative electrode roll which is made of stainless steel and has a diameter of 3 inches.

<Preparation of Pre-Lithiating Apparatus>

A pre-lithiating apparatus as in FIG. 2 was prepared. Specifically, a pre-lithiation reactor made of stainless steel was prepared, and the pre-lithiation reactor was accommodated in a high-pressure chamber. A pre-lithiation solution was injected into the pre-lithiation reactor. The temperature of the pre-lithiation reactor was maintained at 25° C. Herein, the length of the pre-lithiation reactor was 400 cm, and the width of the pre-lithiation reactor was 300 cm.

$LiPF_6$ of 1M concentration as a lithium salt was added to an organic solvent, which was obtained by mixing ethylene carbonate (EC) and ethyl methyl carbonate (EMC) with a volume ratio of 1:8, which was then stirred for 24 hours, to thereby prepare the pre-lithiation solution.

<Pre-Lithiation>

The negative electrode was unwound from the negative electrode roll, was inserted into the pre-lithiation reactor through a transfer roll, and was immersed in the pre-lithiation solution. When the insertion of the negative electrode is completed, the transfer of the negative electrode is stopped, and the sealing member is operated to seal the high-pressure chamber. Thereafter, the internal air pressure of the high-pressure chamber was set to be maintained at 1.1 atm or higher by supplying inert gas through an air blower.

Thereafter, electric current of 1.4 mA was applied to the negative electrode to charge the negative electrode up to 12% of the charge capacity, to thereby pre-lithiate the negative electrode. When pre-lithiation was completed, the operation of the sealing member was stopped, the negative electrode was wound, and the wound negative electrode was taken out. The pre-lithiated negative electrode was obtained by washing and drying the negative electrode.

Example 2

The pre-lithiation process was repeated 10 times using the pre-lithiation solution and the pre-lithiating apparatus of the example 1. Thereafter, the pre-lithiated negative electrode was obtained by performing pre-lithiation in the same manner as in the example 1 by newly inserting the negative electrode into the pre-lithiation reactor of the pre-lithiating apparatus of the example 1.

Comparative Example 1

The pre-lithiated negative electrode was obtained by performing the pre-lithiation in the same manner as in the example 1 except that a pre-lithiating apparatus without a high-pressure chamber was used. In this case, the negative electrode was inserted into the pre-lithiation reactor through a transfer unit, which was then pre-lithiated, and the negative electrode was then taken out of the pre-lithiation reactor and washed and dried.

Comparative Example 2

The pre-lithiation process was repeated 10 times using the pre-lithiation solution and the pre-lithiating apparatus (pre-lithiating apparatus which does not include a high-pressure chamber) of the comparative example 1. Thereafter, the pre-lithiated negative electrode was obtained by performing pre-lithiation by newly inserting the negative electrode into the pre-lithiation reactor of the pre-lithiating apparatus of the comparative example 1.

Comparative Example 3

The negative electrode was obtained by performing pre-lithiation in the same manner as in the example 1 except that the internal air pressure of the high-pressure chamber was maintained at a normal pressure (e.g., atmospheric pressure level) in the pre-lithiating apparatus of the example 1. Specifically, pre-lithiation was performed without operating an air blower.

Comparative Example 4

The pre-lithiation was repeated 10 times in the pre-lithiation condition of the comparative example 3. Thereafter, the pre-lithiated negative electrode was obtained by performing pre-lithiation under the same condition as in the comparative example 3 (maintaining the internal air pressure of the high-pressure chamber at an atmospheric pressure level) by newly inserting the negative electrode into the pre-lithiation reactor of the pre-lithiating apparatus).

Experimental Example

<Preparation of Lithium Secondary Battery>

A positive electrode and a negative electrode prepared in the examples and the comparative examples were prepared, and a polyolefin separator was interposed between the positive electrode and the negative electrode, into which an electrolyte solution was injected, to thereby prepare a battery cell. Herein, the positive electrode was manufactured by applying a positive electrode slurry, which contains $LiCoO_2$ as a positive electrode active material, on a positive electrode current collector made of aluminum. Further, an electrolyte solution, which was obtained by dissolving 1M $LiPF_6$ in an organic solvent obtained by mixing ethylene carbonate (EC) and ethyl methyl carbonate (EMC) at a volume ratio of 3:7, was used.

<Measuring the Height of Pre-Lithiation Solution in Pre-Lithiation Reactor>

After respectively performing pre-lithiation in the examples and the comparative examples, the height of the pre-lithiation solution in the pre-lithiation reactor was measured. The result is shown in Table 1.

<Initial Coulomb Efficiency Test>

The coin-type battery cell was charged using an electrochemical charge-discharge device to thereby measure the initial coulomb efficiency. Specifically, the battery cell was charged with 4.2V (vs Li/Li+) at the current density of 0.1 C and was discharged with 2.5V (vs Li/Li+) at the same current density. At this time, the charge capacity and discharge capacity of the battery cell were measured. Thereafter, the initial efficiency was measured using the ratio of the charge capacity to the discharge capacity as in the Formula 1, and the result was shown in Table 1.

Initial efficiency (%)={(initial discharge capacity)/ (initial charge capacity)}×100        [Formula 1]

<Cycle Characteristics Test>

The coin-type battery cell was charged 100 times and the thickness change rate of the battery cell was measured. The result is shown in Table 1.

Specifically, the battery cell was charged with 4.2V (vs Li/Li+) at the current density of 0.1 C and was discharged with 2.5V (vs Li/Li+) at the same current density up to the third cycle. From the 4th cycle, the charge/discharge was performed with the current density of 0.5 C under the same voltage condition.

TABLE 1

| | Height of electrolyte solution in pre-lithiation reactor (cm) | Initial coulomb efficiency (%) | Thickness change rate after 100 cycles (%) |
| --- | --- | --- | --- |
| Example 1 | 10 | 97.9 | 115 |
| Example 2 | 9.8 | 97.8 | 114 |
| Comparative Example 1 | 10 | 97.5 | 117 |
| Comparative Example 2 | 7.5 | 93.8 | 140 |
| Comparative Example 3 | 10 | 97.6 | 116 |
| Comparative Example 4 | 8.8 | 95.7 | 131 |

Referring to Table 1, in the case of the example 1, comparative examples 1 and 3 which used the pre-lithiation solution in the initial state, the height of the electrolyte solution in the pre-lithiation reactor, the initial coulomb efficiency, and the thickness change rate after 100 cycles was similar to each other. This was because the volatilization of the pre-lithiation solution did not yet occur.

Herein, when the pre-lithiation was repeated about 10 times, the volatilization of the pre-lithiation solution was prevented due to the high pressure in the high-pressure chamber in the example 2, and accordingly, the height of the pre-lithiation solution in the pre-lithiation reactor was almost the same as that in the example 1. Namely, the volume and the composition of the pre-lithiation solution of the example 2 were almost the same as those of the example 1, which shows that uniform pre-lithiation was performed even though the pre-lithiation solution was used for a long time. As a result, it is seen that there is little performance difference between the negative electrodes and battery cells manufactured therefrom according to the examples 1 and 2.

On the other hand, in the case of the comparative example 2, since a high-pressure chamber was not used, a lot of pre-lithiation solution was volatilized. In the comparative example 2, the initial coulomb efficiency and the thickness of the battery cell after 100 cycles were significantly different from the comparative example 1 in which a pre-lithiation solution has been used. This is because the composition of the pre-lithiation solution has been changed as a lot of EMC having a high volatility is volatilized during the volatilization of the pre-lithiation solution. The concentration of lithium ions was enhanced during the pre-lithiation process due to the change in the composition of the pre-lithiation solution, and lithium was partly precipitated in the negative electrode during the pre-lithiation. As such, non-uniform pre-lithiation of the negative electrode was caused. Further, the change in the shape and constituents of the SEI film formed on the surface of the negative electrode due to the change of the composition of the pre-lithiation solution may be the cause of the change in the initial coulomb efficiency and the thickness change rate after 100 cycles. This increases the thickness of the battery cell due to gas generation by lithium precipitation in the battery cell.

Further, in the case of the comparative example 4, the amount of volatilization of the pre-lithiation solution decreased due to the existence of a high-pressure chamber, compared to the comparative example 2. However, in the case of the comparative example 4, since the air pressure of the high-pressure chamber is not high, the electrolyte solution was volatilized by a certain degree. As such, the performance of the negative electrode and the battery cell decreased, compared to the comparative example 3 where the pre-lithiation solution in the initial state has been used.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

On the other hand, in this specification, terms indicating directions such as up, down, left, right, before, and after are used, but it is obvious that these terms are for convenience of description only and may change depending on the location of the object or the location of the observer.

The invention claimed is:

1. An apparatus for pre-lithiating a negative electrode, the apparatus comprising:
   a pre-lithiation reactor having a pre-lithiation solution accommodated therein;
   a high-pressure chamber surrounding the pre-lithiation reactor, wherein an internal air pressure of the high-pressure chamber is configured to exceed atmospheric pressure;
   at least one lithium metal counter electrode disposed in the pre-lithiation solution, the lithium metal counter electrode being disposed to face a negative electrode receivable in the pre-lithiation solution in a state that the lithium metal counter electrode is spaced apart from the negative electrode by a predetermined interval; and
   a charge and discharge unit being connectable to the negative electrode and the lithium metal counter electrode to provide a circuit.

2. The apparatus of claim 1, further comprising a transfer unit configured to transfer the negative electrode into the pre-lithiation reactor or to remove the negative electrode from the pre-lithiation reactor.

3. The apparatus of claim 2, wherein the transfer unit includes a transfer roll to support a lower surface of the negative electrode and moves the negative electrode through rotary motion.

4. The apparatus of claim 1, wherein the internal air pressure of the high-pressure chamber is 1.1 to 10 atm.

5. The apparatus of claim 1, further comprising an air blower to supply gas to an interior of the high-pressure chamber.

6. The apparatus of claim 5, wherein the gas is at least one inert gas selected from the group consisting of argon (Ar), neon (Ne), helium (He) and nitrogen ($N_2$).

7. The apparatus of claim 1, wherein the high-pressure chamber includes an opening through which the negative electrode is inserted into the high-pressure chamber or through which the negative electrode is removed out of the high-pressure chamber.

8. The apparatus of claim 7, further comprising a sealing member to seal a gap between the opening and the negative electrode.

9. The apparatus of claim 8, wherein the sealing member is made of silicon rubber.

10. A method of pre-lithiating a negative electrode, the method comprising:
    preparing a negative electrode and the apparatus for pre-lithiating the negative electrode according to claim 1;
    moving the negative electrode into the pre-lithiation reactor in the high-pressure chamber and immersing the negative electrode in the pre-lithiation solution, wherein the negative electrode is spaced apart from the at least one lithium metal counter electrode;
    sealing the high-pressure chamber and injecting gas into the high-pressure chamber to cause an internal air pressure in the high-pressure chamber to exceed atmospheric pressure; and
    pre-lithiating the negative electrode by charging and discharging the negative electrode to provide a pre-lithiated negative electrode.

11. The method of claim 10, wherein the internal air pressure of the high-pressure chamber is 1.1 to 10 atm.

12. The method of claim 11, wherein the gas is at least one inert gas selected from the group consisting of argon (Ar), neon (Ne), helium (He) and nitrogen ($N_2$).

13. The method of claim 11, further comprising removing the pre-lithiated negative electrode from the high-pressure chamber, and washing and drying the pre-lithiated negative electrode.

14. A method for manufacturing a secondary battery including the method of pre-lithiating a negative electrode according to claim 10.

* * * * *